United States Patent [19]

Yoon

[11] Patent Number: 5,056,839
[45] Date of Patent: Oct. 15, 1991

[54] AUTOMOBILE COVER ASSEMBLY

[76] Inventor: Yi C. Yoon, 113-3 Joongang-Dong Wonju, Kangwon-Do, Rep. of Korea

[21] Appl. No.: 572,643

[22] Filed: Aug. 27, 1990

Related U.S. Application Data

[63] Continuation-in-part of Ser. No. 539,361, Jun. 15, 1990, abandoned, which is a continuation of Ser. No. 289,819, Dec. 22, 1988, abandoned.

[30] Foreign Application Priority Data

May 30, 1988 [KR] Rep. of Korea ............ 88-8029

[51] Int. Cl.[5] .................. B60R 19/48; B60J 11/00
[52] U.S. Cl. .................... 293/117; 296/98; 296/136; 160/23.1; 160/44; 160/262; 160/263; 160/310; 160/370.2; 150/166; 217/60 B; 217/60 D; 362/155; 70/77; 70/237; 70/258
[58] Field of Search ............ 296/98, 136; 293/117; 160/23.1, 44, 262, 263, 310, 370.2, 389, 402; 150/166; 217/60 B, 60 D, 60 E; 362/154, 155, 156; 70/237, 258, 77

[56] References Cited

U.S. PATENT DOCUMENTS

| | | | |
|---|---|---|---|
| 125,334 | 4/1872 | Rutherford | 217/60 D |
| 456,200 | 7/1891 | Maxedon | 160/262 |
| 564,573 | 7/1896 | Hartshorn | 160/402 |
| 808,414 | 12/1905 | Weilert | 160/127 |
| 1,071,158 | 8/1913 | Hurlbut | 160/262 X |
| 1,258,940 | 3/1918 | Paul | 160/263 X |
| 1,521,134 | 12/1924 | Suarez | 217/60 D |
| 1,746,810 | 2/1930 | Anderson | 362/155 |
| 1,798,259 | 3/1931 | Hartshorn | 160/404 X |
| 1,800,654 | 4/1931 | Nelson | 160/262 |
| 1,856,742 | 5/1932 | Benzee | 160/263 |
| 2,283,329 | 5/1942 | Johnson | 160/389 |
| 2,397,803 | 4/1946 | Murray et al. | 160/44 X |
| 2,455,069 | 11/1948 | Launder | 70/77 |
| 2,723,156 | 11/1955 | Stanziale | 293/117 X |
| 2,724,395 | 11/1955 | Valentine | 242/55 X |
| 3,050,075 | 8/1962 | Kaplan et al. | 296/136 X |
| 3,075,805 | 1/1963 | Golde et al. | 296/98 |
| 3,143,154 | 8/1964 | Best | 150/166 X |
| 3,719,220 | 3/1973 | Small | 160/23.1 X |
| 4,060,310 | 11/1977 | Brown | 160/310 X |
| 4,164,233 | 8/1979 | McAndrew | 135/88 |
| 4,324,427 | 4/1982 | Huang et al. | 296/136 X |
| 4,432,581 | 2/1984 | Guma | 296/136 |
| 4,648,012 | 3/1987 | Pittman, II | 362/155 |
| 4,657,298 | 4/1987 | Yong | 296/136 |
| 4,732,421 | 3/1988 | Ross et al. | 150/166 X |

FOREIGN PATENT DOCUMENTS

| | | | |
|---|---|---|---|
| 542700 | 11/1955 | Belgium | 296/136 |
| 135731 | 4/1985 | European Pat. Off. | 160/23.1 |
| 2123484 | 11/1972 | Fed. Rep. of Germany | 70/237 |
| 3500693 | 7/1986 | Fed. Rep. of Germany | 296/136 |
| 3520448 | 12/1986 | Fed. Rep. of Germany | 296/136 |
| 2585299 | 1/1987 | France | 296/136 |
| 2148366 | 5/1985 | United Kingdom | 160/23.1 |

Primary Examiner—Margaret A. Focarino
Assistant Examiner—Andrew C. Pike
Attorney, Agent, or Firm—Beveridge, DeGrandi & Weilacher

[57] ABSTRACT

A cover assembly for an automobile has a case and a rotary shaft mounted within the case. The case can form an integral component of the automobile bumper and can be either curved or straight. The rotary shaft onto which a cover is rotated can also be straight or curved. The cover assembly includes an operating mechanism which features an assembly for curving the rotary shaft and devices for extending or shortening the rotary shaft. The operating mechanism also includes a bearing assembly that provides the shaft with freedom of movement in a vertical direction and in a clockwise or counterclockwise direction. A cap is pivotably supported to the case and the cover assembly includes a locking device for securing the cap in place. The cover has a main sheet and an auxiliary sheet, with the auxiliary sheet designed for securement with the locking device such that the main sheet can cover above and below the case.

30 Claims, 9 Drawing Sheets

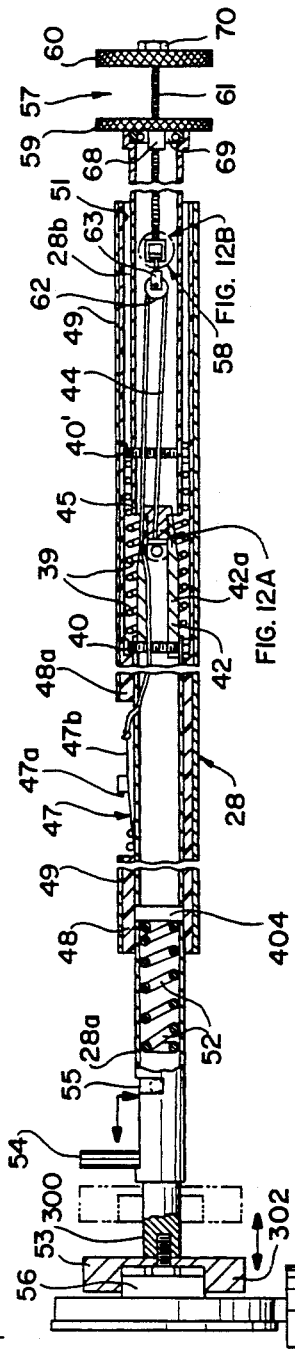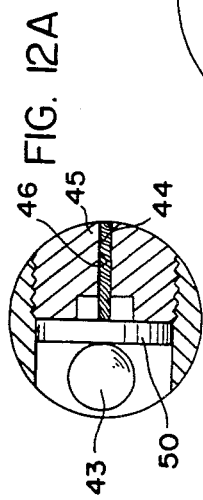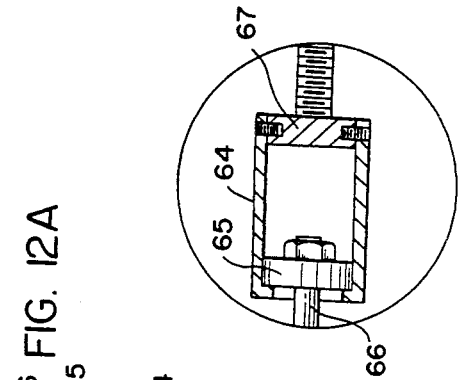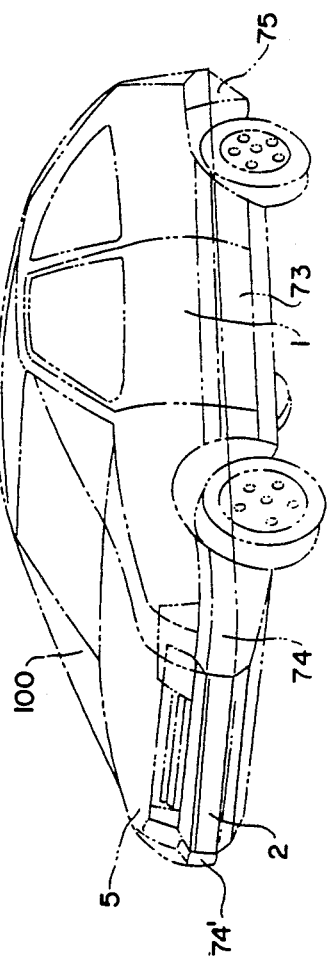
FIG. 12
FIG. 12A
FIG. 12B
FIG. 13

AUTOMOBILE COVER ASSEMBLY

CROSS REFERENCE TO RELATED APPLICATIONS

This application is a continuation-in-part of Ser. No. 07/539,361 filed June 15, 1990, (now abandoned), which is continuation of Ser. No. 07/289,819 filed Dec. 27, 1988, (now abandoned).

BACKGROUND OF THE INVENTION

1. Field of the Invention

The present invention relates to a cover assembly for an automobile which includes a casing attached to the automobile. Moreover, the present invention relates to a cover assembly with a casing which provides a component of an automobile bumper and a cover suitable for use with the casing.

2. Background Information

Conventional devices for covering automobiles typically include covers which are folded within the trunk of an automobile or within other suitable storage spaces such as a garage. Conventional covers of this sort must be manually manipulated both in covering and uncovering the automobile. The required physical manipulation of such covers and the storage problems associated with such covers has resulted in the prior art covers only being utilized by a small percentage of car owners.

The prior art also includes containers for storing automobile covers. For example, U.S. Pat. No. 4,732,421 to Ross et al. illustrates a self-storing retractable cover assembly which is removably secured to a bumper and stored in the automobile when not in use. Consequently, this prior art storage device either takes up a lot of storage space or, when affixed to the automobile, degrades the appearance of the automobile and presents an easy target for thieves.

SUMMARY OF THE INVENTION

The present invention features an automobile cover assembly which avoids the aforementioned problems associated with the prior art. In other words, the cover assembly of the present invention does not lessen the storage space within the automobile, provides means for easy set up and removal of the covers, and does not degrade the appearance of the automobile.

The cover assembly of the present invention includes a case together with an operating mechanism positioned therein. The operating mechanism includes a rotary shaft and means for bending the rotary shaft. The operating mechanism further includes mounting means for mounting the rotary shaft within the case. In a preferred embodiment the case forms an integral part of a curved bumper of an automobile and the rotary shaft has a bend which conforms to a curvature of the bumper. The case thus replaces a conventional bumper either in part or completely. In the former situation, extensions can be secured to the case to complete the form of the bumper. In this way, the cover assembly does not degrade the visual appearance of the automobile.

A preferred embodiment of the present invention includes a cover that is specifically designed for use with the case of the present invention. The cover has a main sheet and an auxiliary sheet with one edge attached to the main sheet in a manner which causes the sheets to assume a perpendicular relationship when both sheets are stretched. The main sheet has attachment strips for releasably attaching the cover into a fixed position with respect to the automobile. For example, complementary patches of VELCRO (TM) (synthetic materials which adhere when pressed together) could be provided on the main sheet and in appropriate positions on the automobile. The auxiliary sheet is also preferably provided with attachment strips for releasable securement with the rotary shaft. The cover can thus be rolled onto and off of the rotary shaft in a manner explained in further detail below.

The aforementioned operating mechanism includes mounting means for mounting the rotary shaft within the case. The mounting means comprises bearing members and bearing supports. The bearing supports are designed so as to provide the bearing members with freedom of movement in a vertical direction as well as freedom to rotate about an axis parallel to the vertical direction. Preferably, the bearing members have a diametrically opposed pair of outwardly extending rotary pins and the bearing supports include pin holes adapted for loose reception of the rotary pins. The rotary pins, once positioned within the pin holes, enable the bearing members to be rotated about the bearing supports. Within each of the pin holes is positioned a spring which is compressed when the rotary pin moves vertically deeper within a pin hole.

Preferably the rotary shaft includes a first shaft section, a second shaft section, and an interconnecting spring extending between and partially within each of the shaft sections. The interconnecting spring is attached at its ends to the shaft sections.

A connecting pipe is secured to the interior end of the first shaft section and extends through the interconnecting spring and into the end of the second shaft section. The aforementioned operating mechanism features an arc-shaped slider mechanism fixedly positioned within the case. The opposite end of the second shaft section includes fixing means for releasably fixing the second shaft section at a predetermined position on the arc-shaped slider mechanism. In addition, a portion of both the first and second shaft sections is surrounded by a bendable tube with releasable attachment means provided on the exterior of the bendable tube. The releasable attachment means provided on the tube provides a surface to which the attachment strips formed on the auxiliary sheet can be attached. The bendable tube surrounding these shaft sections preferably is formed of two thicknesses with the thicker portion of the bendable tube surrounding the first shaft section and the thinner portion of the bendable tube surrounding the second shaft section as well as the portion of the interconnecting spring which lies between the adjacent shaft section ends. The fixing means can be releasably fixed to the arc-shaped slider mechanism and by manipulating the position of the fixing means with respect to the arc-shaped slider mechanism, the curvature of the rotary shaft can be adjusted.

In addition to being bendable, the rotary shaft can also be adjusted in length through use of either a first length adjustment assembly or a second length adjustment assembly. The second length adjustment assembly comprises a threaded rod connected to the fixing means. The second length adjustment assembly also includes a threaded member rotatively fixed to the end of the second shaft furthest from the interconnecting spring. The threaded member is designed to receive the threaded rod such that the second shaft section can be varied in position with respect to the threaded rod. The first length adjustment assembly has a bearing housing secured to a roller holder which is secured to a roller. A cable is attached to the connecting pipe positioned between the two shaft sections. The cable extends around the roller and is attached at its opposite end to an adjustment mechanism secured to the exterior of the first shaft section.

In a preferred embodiment the adjustment mechanism includes an adjusting plate and a plate adjusting device for adjusting the position of the plate. The adjusting plate is secured at one end to the cable and is releasably retained to the adjusting device either at its other end or in its mid-section.

To assist in the storage and removal of the cover, a motor is drivingly connected to the rotary shaft. The means used to interconnect the motor and the rotary shaft preferably includes a clutch. The clutch features a rod extension slidably received within the first shaft section. A biasing means such as a spring is connected to the first shaft section at a predetermined distance away from the outer end of the first shaft section. The biasing means is positioned so as to be in contact with the end of the rod extension which is received within the first shaft section. The first shaft section includes an L-shaped slot and the rod extension includes a handle extending perpendicularly from the main body of the rod extension. The handle is slidably detained within the L-shaped slot and adapted to assume a first position wherein the biasing means or spring member is compressed and the clutch disengaged. Alternatively, the handle can be rotated so as to enable the handle and main body of the rod extension to slide towards the driving shaft of the motor such that the spring member is extended and the clutch is engaged with the motor.

In a preferred embodiment of the invention the cover assembly includes a locking means for locking the cap to the case. The locking means includes a support structure positioned within the case and a pipe section is slidably detained within the support structure. A spring is attached to the case at one of its ends and to the pipe section at the other. The opposite end of the pipe section is attached to a cord. A cord is attached at its opposite end to a cylindrical body. The cylindrical body includes a conventional locking mechanism which when rotated in a first position causes a wrapping of the cord and a resultant shift in the pipe section and, when rotated to a second position, causes an unwrapping of the cord about the cylindrical body and a subsequent shift in the pipe section caused by the spring attached to the opposite end of the pipe section. Both the pipe section and the support structure include a plurality of spaced slots. The locking means is adapted to adjust the pipe section into a position wherein the slots of the support structure and the pipe section are aligned and into a second position wherein the slots are non-aligned. The cap includes a plurality of spaced hooks which, when the cap is closed with respect to the case, extend through the holes formed in the support structure. When the cap is to be locked in place, the slots are aligned such that the hooks of the cap can extend through the aligned slots when the cap is closed. The locking means is then used to adjust the position of the pipe section such that the slots are non-aligned and the hooks are prevented from being withdrawn from the slots formed in the support structure.

Preferably the hooks are provided along a rod which is rotatively positioned in the cap. A spring plate or similar retaining device is used to enable the rod (with attached hooks) to rotate to two different rotation positions. The first rotation position places the hooks in a position wherein the hooks can be received within the aligned slots of the support structure and pipe section. The second position places the hooks essentially in a position which is 90 degrees from that of the first position whereby the hooks can be rotated into a position essentially longitudinal with respect to the upper planar surface of the cap. In this way, the hooks can be moved out of the way during placement of the cover over the automobile.

The hooks extending from the cap are adapted to be inserted through the holes formed in the auxiliary sheet. In this way, the hooks can extend through the holes in the auxiliary sheet when the cap is to be locked in a closed position. This arrangement provides a means to lock the cover in place so as to avoid potential theft of the cover. Moreover, the use of the auxiliary sheet allows the main sheet to be extended both above and below the cap of the case such that essentially the entire automobile can be covered.

A preferred embodiment of the invention also includes an arc-shaped hinge member affixed at one of its ends to the cap and having an elongated slot with a hooked end portion. The case includes a pin fixed to the case and adapted to slide within the elongated slot such that the cap can be retained in a fully open position by inserting the pin in the hooked end portion of the elongated slot. To facilitate the opening of the cap, a spring biased projection member is provided within a casing. When the cap is in a locked position, the spring biased projection member is compressed. When the cap is unlocked and the slots of the pipe section and support structure are aligned the compressed spring causes the cap to flip open. It is also contemplated that the spring force of the spring in contact with the projection member be such that the cap is sufficiently flipped open so as to enable the pin to be received within the hooked end section of the arc-shaped hinge member and the cap retained in an open position. It is also contemplated that a switch be positioned within the case member for activating a light either within the case or attached to the cap. Preferably the switch member includes a contact member which can be compressed when the cap is closed. The compression of the contact member causes the deactivation of the light while an opening of the cap allows the contact member to move to a position wherein the light is activated.

The present invention also contemplates the use of a drainage hole formed in the case such that any liquid dripping off of the cover after retraction of the cover into the case can be removed through gravitational flow out of the case. In addition, the present invention contemplates placement of holes in the case which would allow for hot air coming off of the engine of an automobile to pass through the case so as to facilitate the drying of the cover. Further, to even further facilitate the drying of the cover, air flow conduits can be arranged so as to input the air being circulated by the radiator fan of an automobile engine into the case.

Alternatively, the air conduit can be arranged so as to receive air flowing through the grill of an automobile and to pass the air through or near a heated portion of the automobile engine so as to act as a heat exchanger. The opposite end of the conduit would extend into a hole or grill like structure formed in the rear or back portion of the case.

BRIEF DESCRIPTION OF THE DRAWINGS

FIG. 12 illustrates a partially broken away view of the rotary shaft as well as the motor and interconnection therebetween;

FIG. 12A shows an enlarged portion of FIG. 12;

FIG. 12B shows an enlarged portion of FIG. 12;

FIG. 13 shows the cover in position over an automobile and locked in place with respect to the case;

DETAILED DESCRIPTION OF THE PREFERRED EMBODIMENTS

Figure 1:
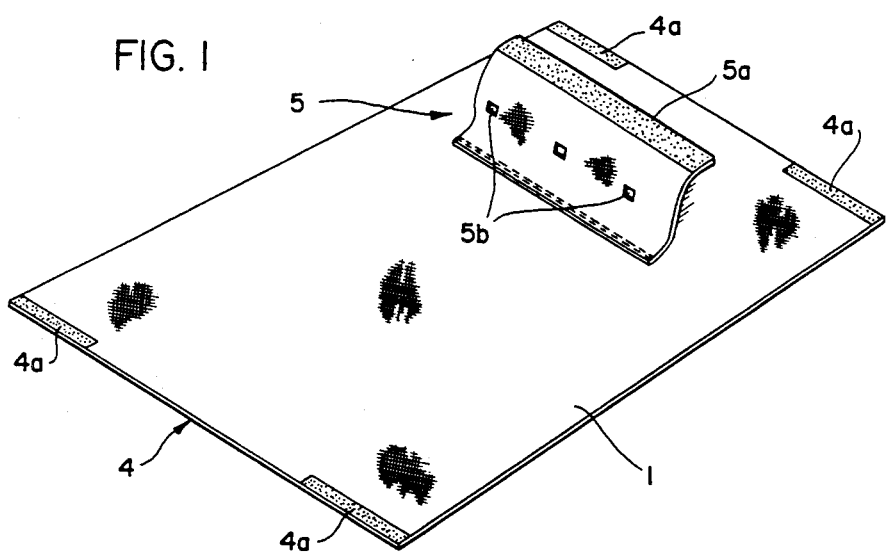
FIG. 1 is a perspective view of the cover according to the present invention.

FIG. 1 illustrates a perspective view of a preferred cover 1 for use in the present invention. Cover 1 includes main sheet 4 having a rectangular shape with the shorter sides having attachment strips secured thereto. Auxiliary sheet 5 is secured along one of its edges to main sheet 4 at a position closer to one of the end edges than to the other. Auxiliary sheet 5 also includes attachment strip 5a and openings 5b.

Figure 2:
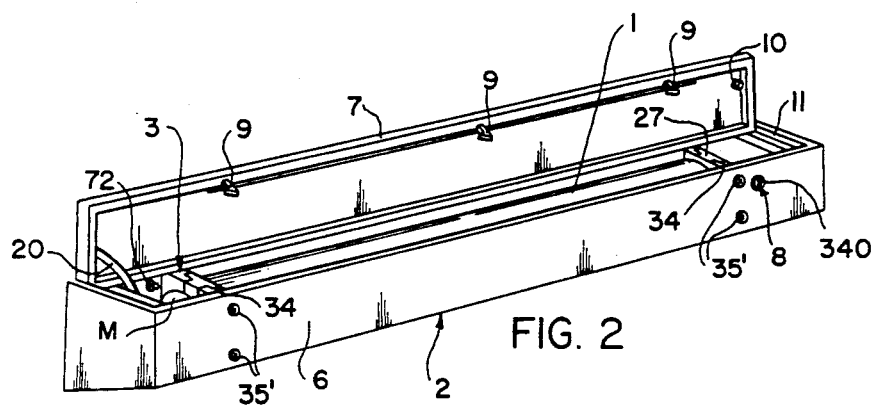
FIG. 2 is a perspective view showing an open state of the case which contains the cover according to the present invention.

FIG. 2 shows in perspective a preferred embodiment of the cover assembly of the present invention which includes case 2 and cap 7 pivotably secured thereto. As shown in FIG. 2, case 2 contains operating mechanism 3 which supports cover 1 when the cover is in a storage state. Case 2 further includes locking means 8 featuring key reception area 340 and a plurality of hooks 9 secured to cap 7.

Cap 7 is pivotably secured to case 2 by arc-shaped hinge 20 while rubber packing 11 provides a cushioning and sealing function when cap 7 is closed. Within case 2 is also position motor M and motor switch 72. Operating mechanism 3 includes bearing support frames 34 which are secured to case 2 by bolts 35'.

Figure 2A:
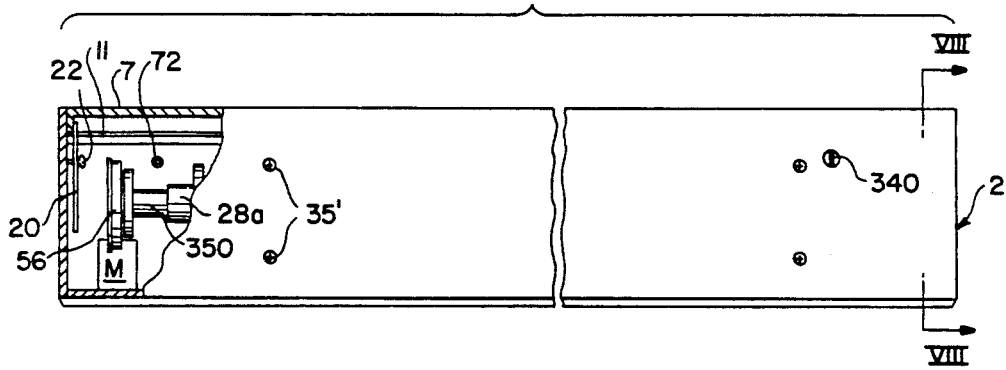
FIG. 2A shows a partially cut away elevational view of the cover assembly with the cap closed.

FIG. 2A shows a planar view of case 2 with cap 7 in a closed position. As shown in the cut away portion of FIG. 2A, arc-shaped hinge member 20 slides upon pin 22 in a manner to be explained in greater detail below. FIG. 2A also illustrates rod extension 350 in engagement with driving shaft 56 of motor M. The source of power for motor M is not shown but could include an electrical connection with the automobile battery or its own battery or an alternate power supply could be provided in case 2. FIG. 2A also illustrates the sealing arrangement between cap 7 and case 2 provided by rubber packing 11.

Figure 2B:
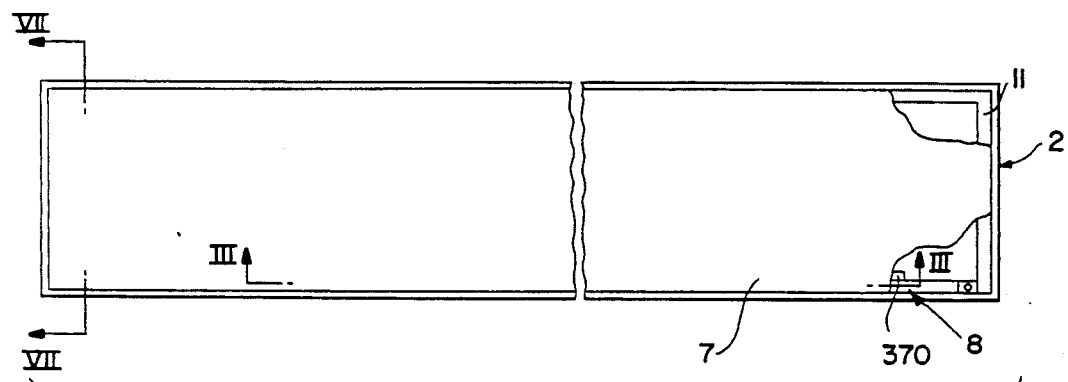
FIG. 2B shows a partially cut away planar view of that which is shown in FIG. 2A.

FIG. 2B illustrates a planar view of case 2 with cap 7 in closed position. FIG. 2B also shows the positioning of packing 11 and cylindrical body 370 forming part of locking means 8.

Figure 3:
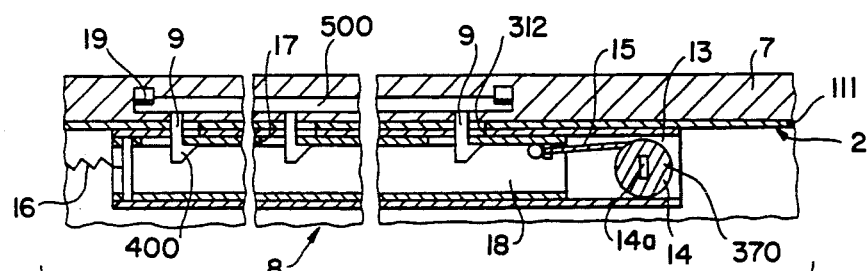
FIG. 3 represents a cross-sectional view taken along cross section line III—III of FIG. 2B with the locking means engaged.
Figure 4:
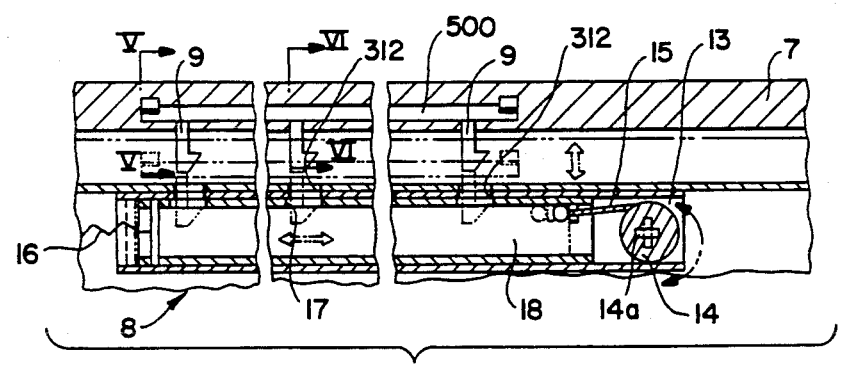
FIG. 4 represents the locking means shown in FIG. 3 in an unlocked state and the cap partially open with respect to the case.
Figure 21:
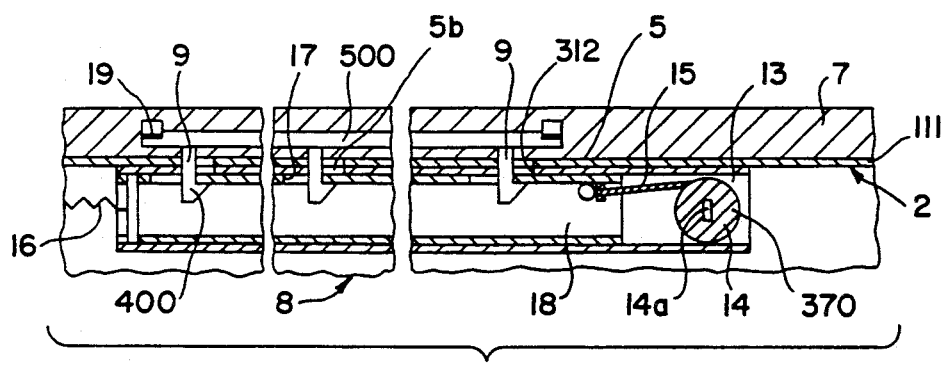
FIG. 21 shows the same view as in FIG. 3 except for the added illustration of the hooks of the locking means extending through holes formed in the auxiliary sheet.

FIGS. 3 and 4 illustrate in greater detail locking means 8. FIG. 3 illustrates cap 7 in locked position with respect to case 2 and, more specifically, ledge 111 of case 2. Locking means 8 includes support structure 13 fixedly secured to case 2 and lock 14 having cylindrical body 370. Lock 14 includes key slot 14a as well as cord 15 which is secured at one end to cylindrical body 370 and at its other end to pipe section 18. Pipe section 18 is secured at one of its ends to the case 2 by way of spring 16. Pipe section 18 is dimensioned so as to slide within support structure 13 and features a plurality of slots 17. Case 2 includes a plurality of slots 312 through which hooks 9 are adapted to pass through. Hooks 9 include a protruding member 400 which is positioned below the interior of pipe section 18 such that when pipe section 18 is shifted in position the slots in slot 17 and pipe section 18 shift so as not to be in alignment with openings 312. This shifting prevents protruding member 400 from passing back through openings 312 formed in casing 2. Hence, cap 7 is in a locking relationship with case 2. Holes 5b in auxiliary sheet 5 (FIG. 1) are spaced so as to receive hooks 9 therethrough when the cap is locked in a closed position. FIG. 21 shows auxiliary sheet 5 locked in position with hooks 9 extending through holes 5b formed in auxiliary sheet 5.

FIG. 4 shows cap 7 in an unlocked position. As shown in FIG. 4, pipe section 18 is shifted by manipulation of lock 14 such that slots 17 align with openings 312 formed in case 2. This arrangement allows for hooks 9 to be removed from slots 312 or inserted into slots 312.

Figure 5:
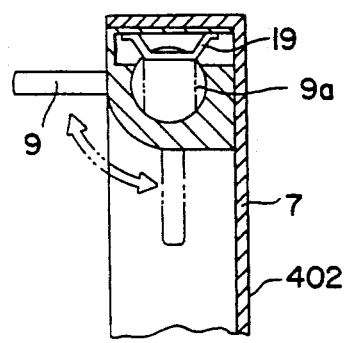
FIG. 5 represents the cross-sectional view taken along cross section line V—V in FIG. 4.
Figure 6:
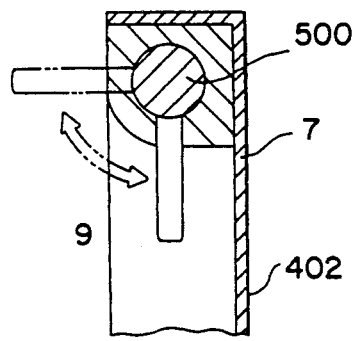
FIG. 6 represents a cross-sectional view taken along cross section line VI—VI of FIG. 4.

FIGS. 5 and 6 represent cross-sectional views taken along cross section lines V—V and VI—VI of FIG. 4. FIGS. 5 and 6 illustrate rod 500 which is pivotably supported in cap 7. Rod 500 has hooks 9 extending thereoff in a serially spaced arrangement. Attached to cap 7 is plate spring 19 which is in engagement with perpendicular member 9a forming part of rod 500. Plate spring 19, in conjunction with perpendicular member 9a, enable hooks 9 to be positioned in either one of two rotation positions. In a first rotation position, hook 9 extends essentially perpendicular to upper planar surface 402 of cap 7. In this arrangement, hooks 9 are arranged for locking via locking means 8. The second position for hooks 9 is shown in FIG. 6 to be one wherein hooks 9 extend essentially parallel with upper planar surface 402. In this position, the hooks are tucked away so as not to interfere with the cover as it is being placed over the automobile or rolled back into position within casing 2.

Figure 7B:
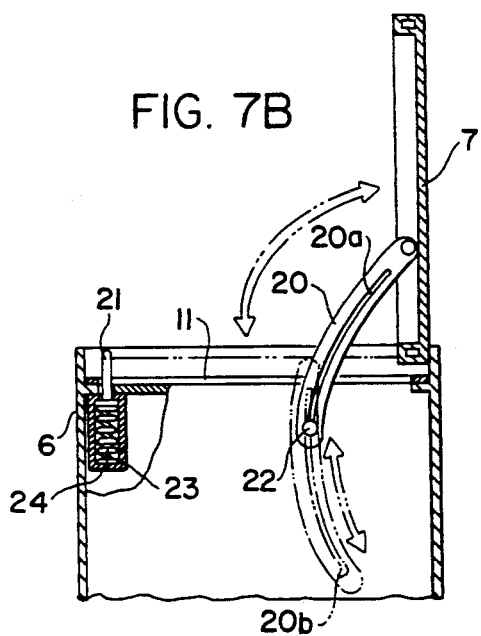
FIG. 7B shows the same view as FIG. 7A except for the cap in an open position.
Figure 7A:
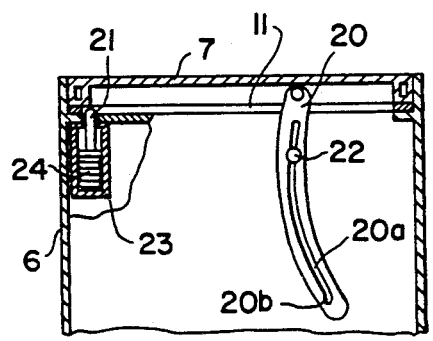
FIG. 7A shows a partially cut away cross-sectional view taken along cross section line VII—VII of FIG. 2B.

FIG. 7A shows a partially broken, cross-sectional view taken along cross section line VII—VII in FIG. 2B. FIG. 7A shows cap 7 in contact with rubber packing 11 as well as arc-shaped hinge member 20 and pin 22. Arc-shaped hinge member 20 has an extended slot 20a which includes a hook shaped slot extension 20b. FIG. 7A also shows spring casing 23 secured to the front part 6 of case 2. Casing 23 contains spring 24 which acts to bias projection member 21. Projection member 21 contacts cap 7 when cap 7 is in a locked position and compresses spring 24.

FIG. 7B shows the same view as that shown in FIG. 7A except for cap 7 being in an open position. FIG. 7B further illustrates pin 22 being received within hook shape slot 20b such that cap 7 is releasably fixed in an open position. Further, projection member 21 is shown to be extended due to the extension of spring 24 within container 23. The present invention contemplates the use of a spring having sufficient force to cause cap 7 to rotate to the position shown in FIG. 7B such that it is releasably retained in the aforementioned open position.

Figure 8A:
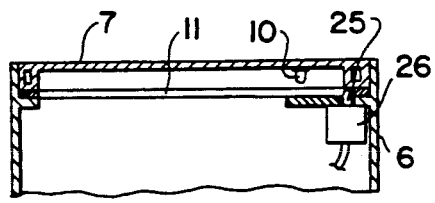
FIG. 8A shows a partially cut away view taken along cross section line VIII—VIII in FIG. 2A.

FIG. 8A shows a partially broken away, cross-sectional view taken along cross section line VIII—VIII of FIG. 2A. As shown in FIG. 8A, cap 7 is in a closed position with respect to case 2. FIG. 8A also illustrates switch 26 having contact member 25. Switch 26 is electrically connected to light 10 such that when cap 7 is in contact with contact member 25 light 10 is unlit.

Figure 8B:
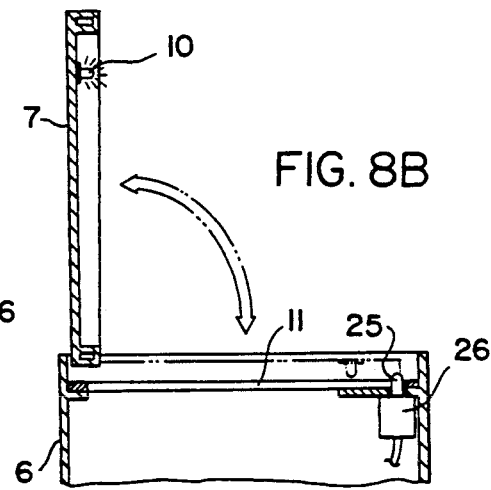
FIG. 8B shows that which is shown in FIG. 8A except for the cap in an open position.

FIG. 8B represents the same view as in FIG. 8A except cap 7 is in an open position. FIG. 8B also illustrates contact member 25 in an extended position. When contact member 35 is in an extended position, light 10 is lit.

Figure 9:
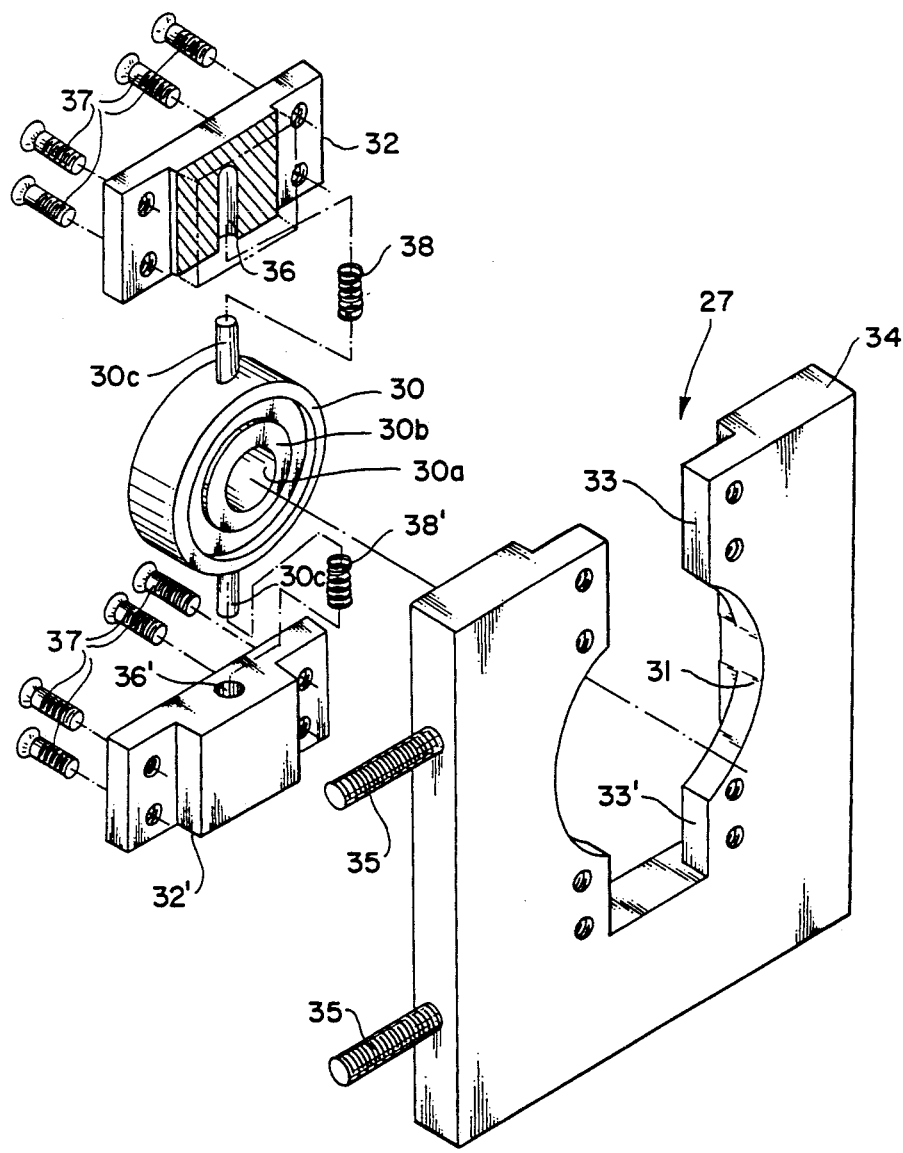
FIG. 9 is an exploded view of the bearing assembly according to the present invention.

FIG. 9 shows an exploded view of bearing assembly 27 which forms part of operating mechanism 3 (see FIG. 2). Bearing assembly 27 includes bearing support frame 34 having bolt extensions 35 extending therefrom. Bolt extensions 35 pass through complementary apertures formed in the rear wall of case 2 and connect to the automobile at the same point a conventional bumper would be affixed. In other words, case 2 is designed so as to be attached to the bumper support structure of an automobile such that case 2 provides the dual function of storing the cover and performing the functions of an automobile bumper. Further, the cover, when in a rolled state within the case, provides an added damping feature to the bumper.

The opposite end of bearing support frame 34 can include either an extended bolt with nut 35' or a recess for receiving a bolt through the front wall of case 2. Bearing support frame 34 includes opening 33, 31, and 33'. Within opening 33 is inserted bearing support 32, preferably by securement with a plurality of screws 37. Similarly, bearing support 32' is secured within opening 33' of bearing support 34 by screws 37. Both bearing support 32 and 32' include a pin hole (36, 36') having a spring 38, 38' positioned therein. Rotary shaft hole 30a is formed in bearing 30b with the latter being supported by main part 30. Extending off main part 30 in diametrically opposed fashion are rotary pins 30c. Rotary pins 30c are adapted to be retained within pin holes 36 and 36'. The tolerance between the pin holes 36, 36' and the rotary pins 30c is sufficient to enable main part 30 to rotate either counterclockwise or clockwise with respect to bearing support frame 34. In addition, upon compression of springs 38, 38', main part 30 is also capable of shifting either up or down within pin holes 36, 36'.

FIGS. 12, 12A and 12B illustrate rotary shaft 28, clutch 53, motor M and the means for adjusting the length of shaft 28 and the means for varying the curvature or bend of shaft 28. As can be seen, casing 2 within which rotary shaft 28 and motor M are positioned has been removed for the sake of clarity. In addition, FIG. 12 illustrates rotary shaft 28 not in engagement with cover 1.

FIG. 12 shows rotary shaft 28 having first shaft section 28a and second shaft section 28b. The first and second shaft sections 28a and 28b are interconnected with interconnecting spring 39 with its ends attached to pins 40, 40'. Pin member 40 is connected to the inside end of first shaft section 28a while pin 40' is connected to the inside end of shaft section 28b. Also connected to pin 40 is connecting pipe 42 having sloping part 42a. Connecting pipe 42 is surrounded by interconnecting spring 39 and connecting pipe 42 has a free end which extends into or towards the hollow interior of second shaft section 28b. The sloping part 42a of connecting pipe 42 has a threaded surface which receives threaded plug 45.

As shown best in FIG. 12A, plug 45 includes slit 46 through which cable 44 extends. Within plug 45 is retained bearing disk 50 as well as stationary ball 43 which is connected to the end of cable 44. Cable 44 extends about roller 62 and back through the hollow interior of second shaft section 28b, through connecting pipe 42, and out through an aperture formed in first shaft section 28a. The end of cable 44 which passes through the aperture and first shaft section 28a is fixed to adjustment plate 47b which forms part of first length adjustment means 47. First length adjustment means 47 includes adjusting device 47a through which adjustment plate 47b passes. By manipulating adjusting device 47a, it is possible to shift the position of adjustment plate 47b so as to either decrease or increase the length of the rotary shaft 28. For example, by shifting adjustment plate 47b to the left in FIG. 12, connecting pipe 42 is drawn inwardly such that interconnecting spring 39 is compressed and first and second shaft sections 28a and 28b are drawn closer together. By shifting adjusting plate 47b to the right, cable length 42 is slackened such that interconnecting spring 39 can force first and second shaft sections 28a and 28b away from each other as roller 62 rotates.

FIGS. 12, 12A and 12B illustrate a second length adjustment assembly. Second shaft section 28b has bearing assembly 69 secured to its outer end. Received within bearing assembly 69 is threaded cylinder 68 secured to threaded adjustment member 59. Threaded rod 61 extends through threaded cylinder 68 and is attached to roller holder 58. At the outer end of threaded rod 61 is secured fixing means 60 by way of lock nut 70. Roller holder 58, as shown in FIG. 12B, features fixer 67 and cylinder 64 which retains bearings 65 therein. Bearing 65 is connected to one end of connecting bar 66 and the other end of connecting bar 66 is secured to pulley bracket 63 supporting roller 62.

With adjustment means 47 and fixing means 60 fixed, a rotation of threaded cylinder 68 can cause, depending on the direction of rotation, the inward movement of second shaft section 28b or the outward movement of second shaft section 28b along threaded rod 61. Also with adjustment means 47 fixed and fixing means 80 rotated while in contact with slider mechanism 71 (FIG. 10), the rotation of bar 61 will result in either an inward or outward movement of second shaft section along threaded rod 61. Also, left rotary shaft section 28a is essentially longitudinally fixed (e.g. high friction interference fit) to the bearing member, but rotary shaft section 28b is drawn inwardly with adjustment means 47; only rotary shaft section 28b is able to slide longitudinally within bearing assembly 27.

At the outward end of first shaft section 28a there is provided pin 404 and a slot 55 which, in planar view, is L-shaped. Between slot 55 and pin 404 is positioned biasing means 52 which in a preferred embodiment includes a helical spring. Rod extension 300, which forms a component of clutch 53, has a free end that extends into the hollow interior of first shaft section 28a. Rod extension 300 includes outwardly extending handle 54 which is received in sliding fashion within slot 55. Spring 52 is retained between pin 404 and rod extension 300 so as to bias rod extension 300 outwardly. Clutch 53 includes engagement means 302 for engaging with drive shaft 56 which is driven by motor M. Engagement means 302 can be placed in driving engagement with driving shaft 56 when handle 54 is placed in its most outward position within slot 55. In this position spring 52 is in its most extended state. If disengagement is desired, handle 54 is adjusted inwardly and then rotated so as to be locked within the shorter leg of the L-shaped slot. In this position, spring 52 is in its most compressed state. Thus, if the cover is to be unrolled manually from rotary shaft 28, the clutch is placed in a disengaged state and the operator freely draws cover 1 out from case 2. When it is desired to place cover 1 in a storage position within case 2, the clutch can be placed in an engaged state and the motor M turned on by way of switch 72.

Figure 10:
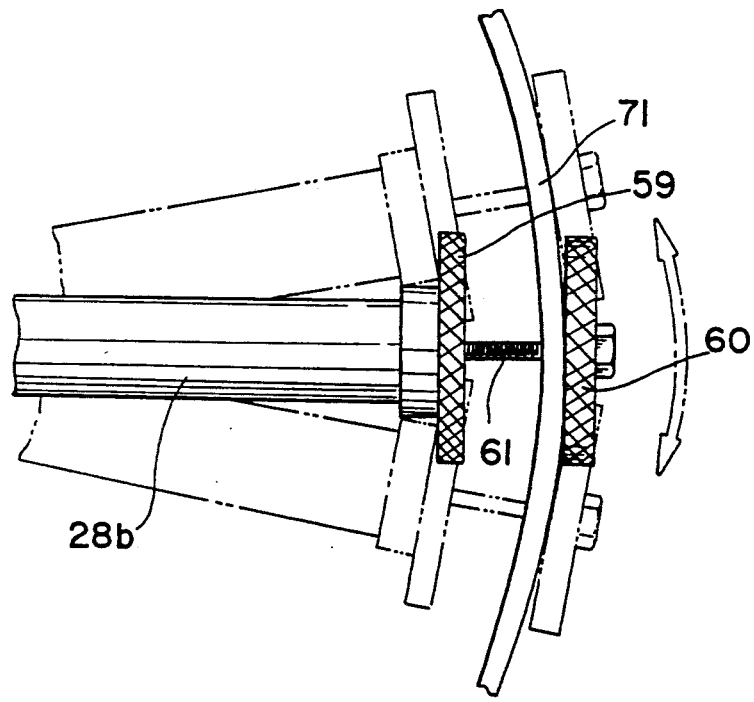
FIG. 10 is a planar view showing the sliding mechanism of the present invention in various positions.
Figure 11:
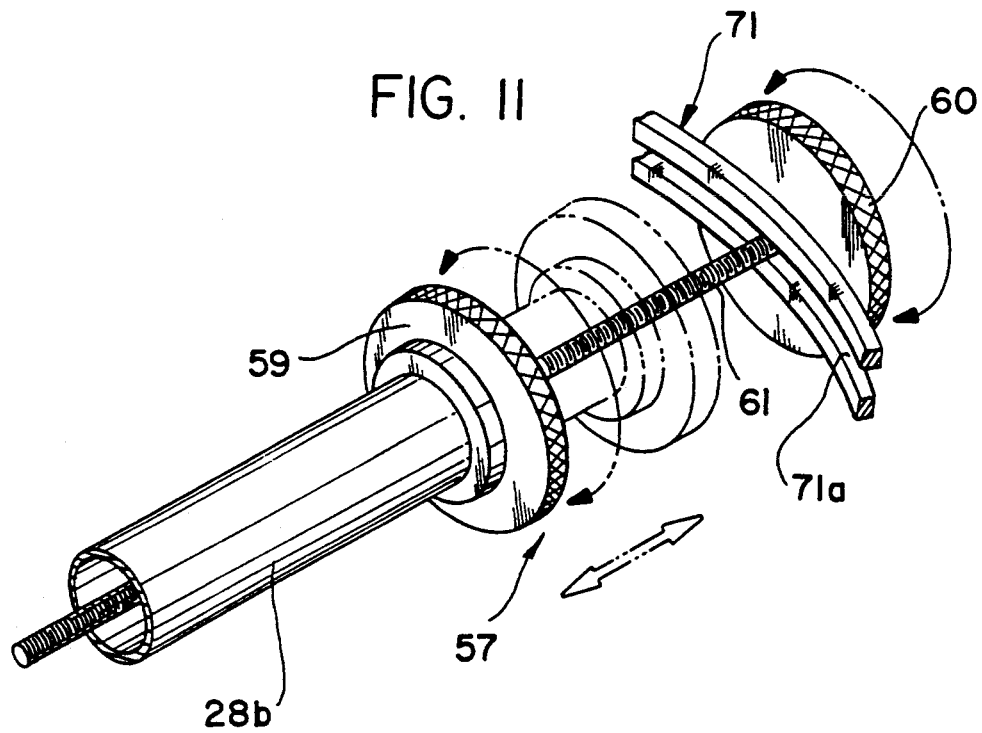
FIG. 11 is a perspective view showing the adjusting mechanism situated at one end of the rotary shaft.
Figure 17:
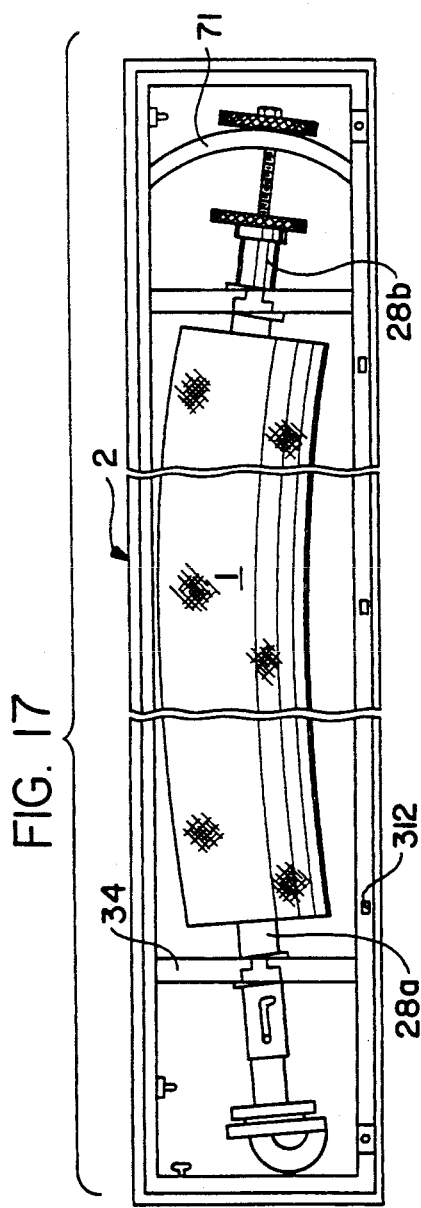
FIG. 17 shows in planar view the case without a cap, with the rotary shaft of FIG. 15 positioned within the case.

In addition to allowing for length adjustment of rotary shaft 28, length and curvature adjusting assembly 57 which includes threaded bar 61, fixing means 60, and threaded adjustment member 59, can be used to adjust the curvature or bend of shaft 28. FIGS. 10 and 11 illustrate in greater detail the manner in which rotary shaft 28 is fixed in a curved state such as that shown in FIG. 15. As shown in FIG. 10 and FIG. 17, arc-shaped slider mechanism 71 is fixedly secured within case 2. FIG. 11 illustrates slot 71a formed in slider mechanism 71. Threaded rod 61 extends through slot 71a and fixing means 60 is placed in contact with arc-shaped slider mechanism 71. The dash lines in FIGS. 10 and 11 illustrate the manner in which second shaft section 28b is extended away from first shaft section 28a and also how second shaft section 28b can be adjusted so as to create a curvature in shaft 28a.

FIG. 10 shows the manner in which threaded rod 61 is slid within slot 71a. A shifting of adjustment plate 47b to the right decreases the frictional contact between fixing means 60 and arc-shaped slider mechanism 71 such that the various positions shown in solid and dash lines in FIG. 10 can be achieved. Once the desired curved configuration of the rotary shaft and supported cover is achieved, frictional contact between fixing means 60 and slider mechanism 71 can be increased by decreasing the overall length of the rotary shaft by adjusting adjustment means 47. Cable 44 also prevents any drooping of the shaft sections 28a and 28b.

FIG. 11 illustrates the varying positions shaft section 28b can assume with respect to slider mechanism 71 when either fixing means 60 is rotated or threaded adjustment member 59 is rotated.

Referring once again to FIG. 12, there is illustrated bendable tube 48 having thick section 48a surrounding first shaft section 28a and thinner tube section 51 surrounding interconnecting spring 59 and second shaft section 28b. Thinner tube section 51 is dimensioned so as to provide a clearance section 51. Bendable tube 48 is adapted to be curved or bent along with the curvature of the rotary shaft. Surrounding bendable tube 48 is attachment surface 49 to which attachment strip 5a is secured.

Figure 20:
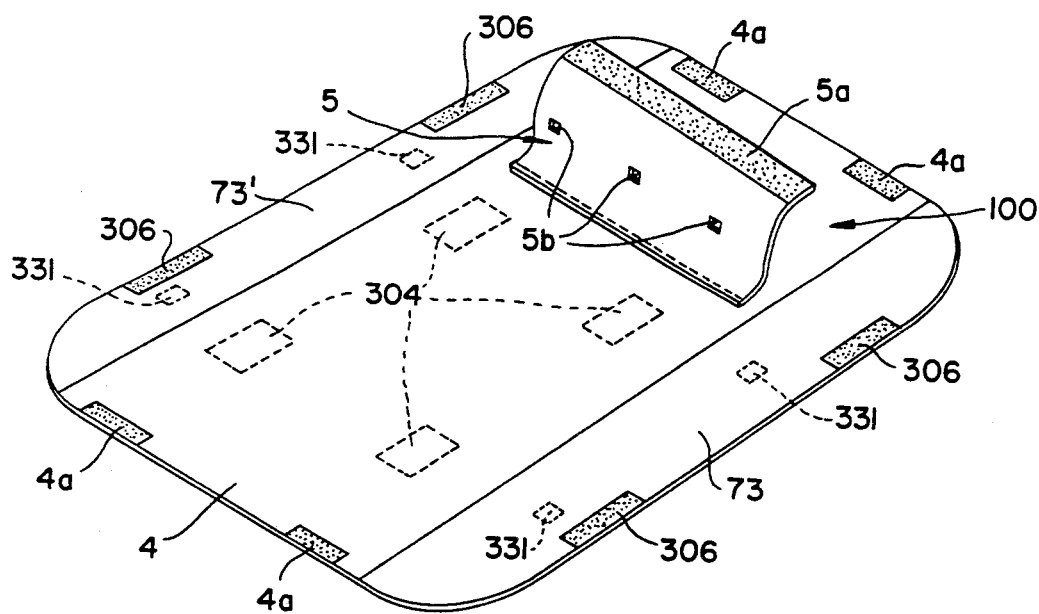
FIG. 20 shows a perspective view of an alternative embodiment of the cover.

FIG. 20 shows a second preferred embodiment for cover 1 comprising mid-section 100 which has main sheet 4 and auxiliary sheet 5. Main sheet 4 has attachment strips 4a and auxiliary sheet 5 has attachment strips 5a and openings 5b similar to those shown in FIG. 1. Positioned on the opposite side of main sheet 4 are attachment strips 304. Extending off the side edges of main sheet 4 are side panels 73 and 73'. Side panels 73, 73' include attachment strips 306 which are positioned for engagement with the automobile. Positioned on the opposite side of side panels 73 and 73' are attachment strips 331 which attach to attachment strips 304 when side panels 73, 73' are folded over onto mid-section 100. In the folded state, cover 1 can easily be rolled onto or rolled off of rotary shaft 28. Moreover, once the mid-section is placed over the automobile, the side panels can be easily detached to cover essentially the entire automobile. FIG. 13 illustrates such an arrangement where mid-section 100 and side panels 73, 73' cover essentially the entire automobile. FIG. 13 also illustrates case 2 forming an integral part of the automobile bumper. As shown, case 2 forms a mid-portion of the bumper while extension 74 and 74' complete the bumper. FIG. 13 also illustrates rear bumper 75. If desired, case 2 can be formed as an integral part of the rear bumper rather than the front bumper.

Figure 14:
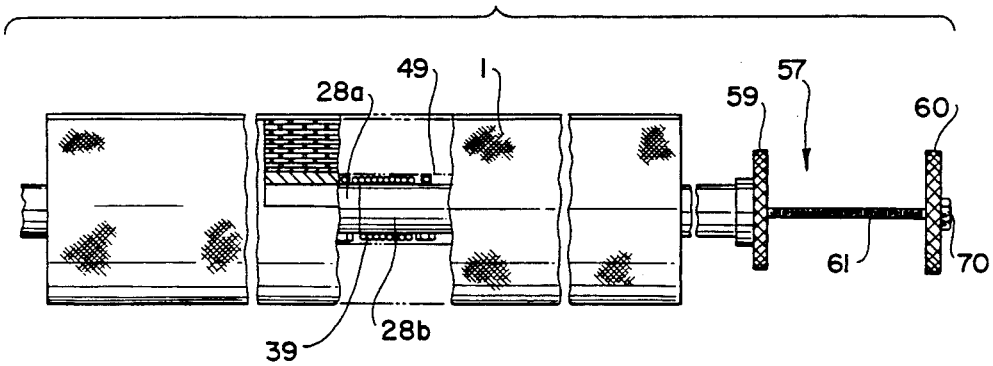
FIG. 14 shows in a partially broken away view the rotary shaft in an unbent and compressed state with a cover rolled thereon.

FIG. 14 illustrates cover 1 rolled about first and second shaft sections 28a and 28b. FIG. 14 also illustrates rotary shaft sections 28a and 28b in their most compressed state as well as attachment strip 49 to which the attachment strip 5a of auxiliary sheet 5 is secured.

Figure 15:
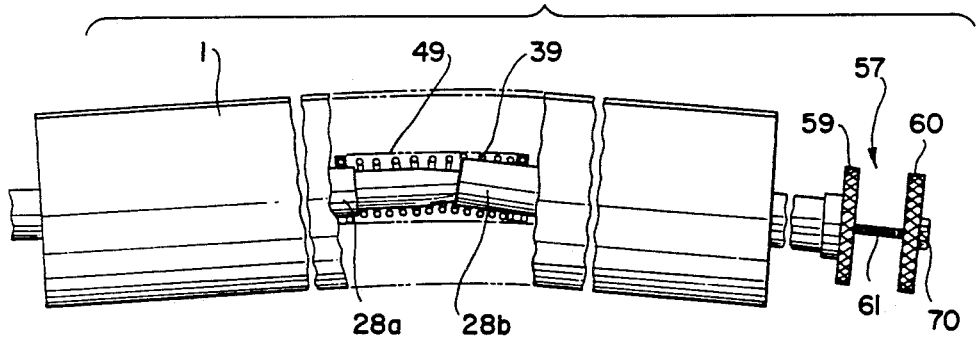
FIG. 15 shows that which is shown in FIG. 14 except for the rotary shaft being in a bent condition and of greater length.

FIG. 15 illustrates rotary shafts 28a and 28b in a bent configuration with spring 39 in its most extended state. Also, FIG. 15 shows the length shaft 28 assumes to achieve such a bent configuration.

Figure 16:
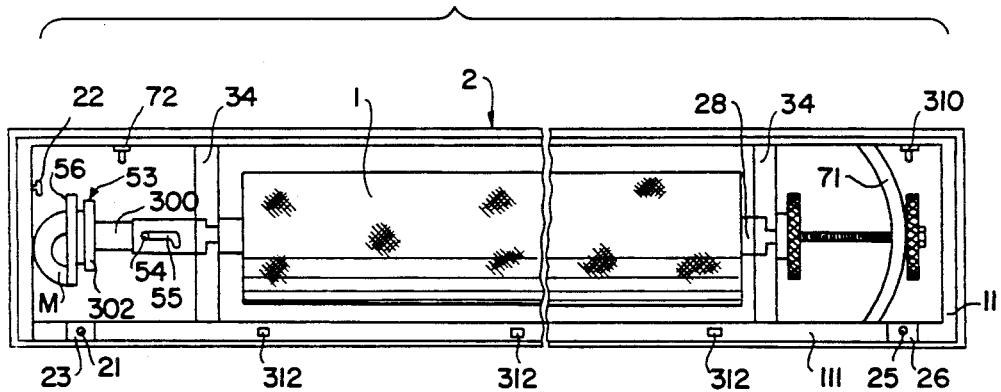
FIG. 16 shows a planar view of the case without a cap, with the rotary shaft and cover of FIG. 14 placed within the case.

FIG. 16 illustrates both rotary shaft 28 and cover 1 in a non-bent configuration and supported by bearing support frames 34 within case 2. FIG. 16 also illustrates lamp switch 26 and contact member 25 as well as a separate lamp switch 310 which can be used to turn off the light in the daytime. FIG. 16 also shows rubber packing 11 covering three sides of ledge 111. Slots 312 are spaced along ledge 111 of case 2.

Alternatively, packing 11 can extend entirely about ledge 111 and include a plurality of slots coinciding with those in ledge 111. The planar view of case 2 without cap 7 further illustrates L-shaped slot 55 with handle 54 positioned therein. As shown, slot 55 is formed in the outward end of first shaft section 28a and rod extension 300 is shown to extend within the hollow interior of shaft section 28a. In addition to rod extension 300, clutch 53 includes engagement means 302 in engagement with driving shaft 56 of motor M.

FIG. 17 is similar to FIG. 16 except for rotary shaft 28 and cover 1 being in a curved or bent configuration.

Figure 18:
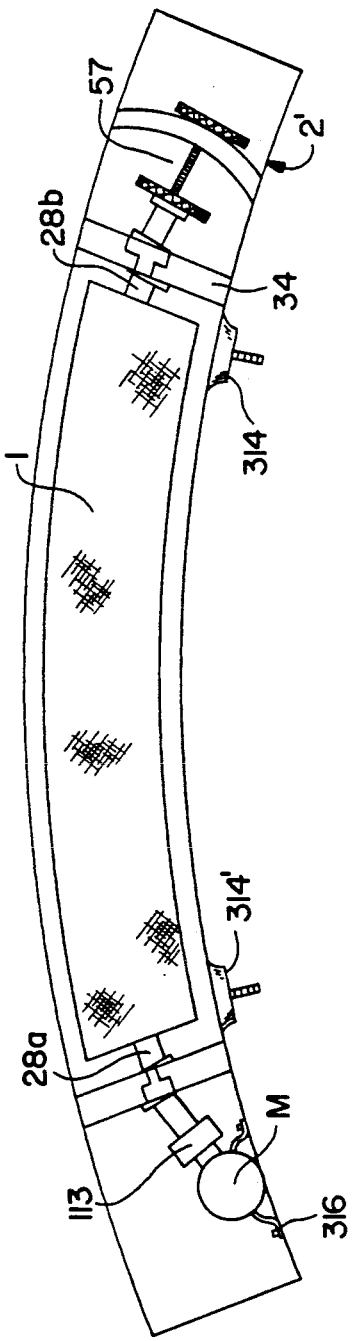
FIG. 18 shows an alternate embodiment of the invention wherein the case and rotary shaft are in a bent or curved state.

FIG. 18 shows an alternate embodiment of the invention having a curved bumper and casing combination 2' together with bumper mounting means 314 and 314'. The rotary shaft 28 and the remainder of the structure is similar to that which is shown in FIG. 17 and thus further discussion is not deemed necessary Bearing support frame 34, however, is not provided with an extended bolt as the connection to the automobile support is achieved with members 314 and 314'. FIG. 18 also illustrates motor M being in a different position than that in FIG. 17. In FIG. 18, motor M is secured to the rearward wall of casing 2' by way of support brackets 316. Also, there is provided a universal type engagement 113 between motor M and first shaft section 28a.

Figure 19:
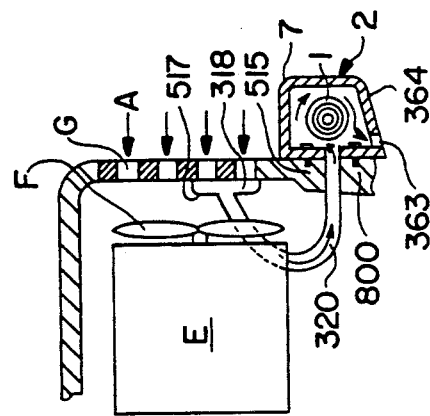
FIG. 19 shows a schematic view of the cover drying system of the present invention.

FIG. 19 illustrates a drying device which can be used in conjunction with the present invention. Case 2 has one or more air openings 515 formed in its rear wall. Case 2 includes drain opening 363 as well as sloping bottom wall 364 which together facilitate a gravity drainage of any liquid contained in case 2. In addition, FIG. 19 illustrates air receiving means 318 attached to the interior of an automobile's grill G. Air A rushing through grill G is received by air receiving means 318 which includes scoop 517 and passed along conduit 320 into the rear wall opening formed in case 2 such that drying of cover 1 is expedited. Preferably, the conduit extends close to the engine E but away from fan F such that the engine acts as a heat exchanger for the air passing through conduit 320. Alternatively, a plurality of openings or a series of slots can be formed in the rear wall of case 2 for receipt of heated air derived from engine E and passing naturally through the openings formed in case 2. FIG. 19 also illustrates bumper support means 800 supporting case 2.

Although the present invention has been described with reference to preferred embodiments the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A cover assembly for an automobile comprising: a case; and
an operating mechanism, said operating mechanism including a rotary shaft and means for bending said rotary shaft, and said operating mechanism further including mounting means for mounting said rotary shaft within said case, and said case forming a part of a curved bumper of the automobile and said rotary shaft having a bend conforming to a curvature of the 2. An automobile cover assembly as recited in claim 1, further comprising a cover which includes a main sheet and an auxiliary sheet having one edge attached to said main sheet, and said main sheet having attachment strips for releasably attaching said cover into a fixed position with respect to the automobile.

3. A cover assembly for an automobile, comprising: a case; and an operating mechanism, said operating mechanism including a rotary shaft and means for bending said rotary shaft, said operating mechanism further including mounting means for mounting said rotary shaft within said case, and said mounting means including bearing members and bearing supports, said bearing supports providing said bearing members with freedom of movement in a vertical direction and with freedom to rotate about an axis parallel to the vertical direction.

4. An automobile cover assembly as recited in claim 3, wherein said bearing members each include a pair of outwardly extending rotary pins, and said bearing supports include pin holes adapted to loosely receive said rotary pins so as to enable rotation of said bearing members, and said mounting means including springs each positioned within a respective one of said pin holes so as to allow for vertical movement of said bearing members.

5. An automobile cover assembly as recited in claim 3, further comprising a cover releasably attached to said rotary shaft and adapted to roll onto and off of said rotary shaft.

6. An automobile cover assembly as recited in claim 5, wherein said cover includes a main sheet and an auxiliary sheet attached along one edge to said main sheet, and said main sheet having attachment strips for releasably attaching said cover into a fixed position with respect to the automobile.

7. An automobile cover assembly as recited in claim 5, wherein said case has an opening formed therein positioned for receiving heated air derived from automobile engine heat so as to assist in cover drying.

8. An automobile cover assembly as recited in claim 3, wherein said operating mechanism includes length adjustment means for length adjustment of said rotary shaft to different fixed lengths.

9. An automobile cover assembly as recited in claim 3, wherein said case forms a part of a curved bumper of the automobile and said rotary shaft is curved to conform to a curvature of said bumper.

10. An automobile cover assembly as recited in claim 3, wherein said rotary shaft includes a first shaft section, a second shaft section, and a spring interconnecting a first end of each of said first and second shaft sections, said operating mechanism further comprising an arc-shaped slider mechanism fixed within said case, and a second end of said second shaft section including fixing means for releasably fixing said second shaft section at a predetermined position on said arc-shaped slider mechanism.

11. An automobile cover assembly as recited in claim 10, wherein a portion of both said first and second shaft sections is surrounded by a bendable tube with releasable attachment means provided on an exterior portion of said bendable tube.

12. An automobile cover assembly as recited in claim 11, further comprising a cover of flexible material; and wherein said cover includes a strip of releasable attachment means for releasably securing said cover to said releasable attachment means positioned on said flexible tube.

13. An automobile cover assembly as recited in claim 10, wherein said operating mechanism further includes length adjustment means for length adjustment of said rotary shaft to different fixed lengths.

14. An automobile cover assembly as recited in claim 13, wherein said length adjustment means includes a first length adjustment assembly and a second length adjustment assembly, said first length adjustment assembly including a bearing housing, a roller holder rotatively secured at one end to said bearing housing, a roller rotatively attached to said roller holder, a connecting pipe surrounded by said interconnecting spring, and a cable, said cable being fixed at one end to said connecting pipe and wrapped around said roller, and said cable being attached at an opposite end to an adjustment mechanism which is attached exterior to said first shaft section, and said second length adjustment assembly comprising a threaded rod connected to said fixing means, a threaded member rotatively fixed to the second end of said second shaft and adapted to receive said threaded rod, and said threaded rod being secured to said bearing housing.

15. An automobile cover assembly as recited in claim 14, wherein said adjustment mechanism includes an adjusting plate and a plate adjusting device for adjusting a position of said plate, said adjusting plate being secured at one end to the opposite end of the cable and at another end to said adjusting device.

16. An automobile cover assembly as recited in claim 3, further comprising a motor, and said rotary shaft including a first shaft section and a second shaft section with said first shaft section having a hollow interior;
   a spring member positioned within the hollow interior of said first shaft section and having one end fixed to said first shaft section, and said first shaft section further including an g-shaped slot;
   a clutch adapted to come into driving engagement with said motor, said clutch including a rod extension slidably received within the hollow interior of said first shaft section and said rod extension being in contact with said spring member, said rod extension including a handle slidably detained within said L-shaped slot and adapted to assume a first position wherein said spring member is compressed and said clutch disengaged, and a second position wherein said spring member is extended and said clutch is engaged with said motor.

17. An automobile cover assembly as recited in claim 3, further comprising a cap and an arc-shaped hinge member affixed at one end to said cap, said cover assembly further comprising a gin fixed to said case, said arc-shaped hinge member having an elongated slot with a hooked end portion, and said pin being adapted to slide within the elongated slot whereby said cap is retained in a full open position by placing said pin in the hooked end portion of said elongated slot.

18. An automobile cover assembly as recited in claim 17, further comprising a light, and a switch which activates and deactivates said light, said switch including a projection which is compressed when said cap is in a closed position such that said light is unlit, and extended when said cap is open such that said light is lit.

19. An automobile cover assembly as recited in claim 3, wherein said case includes a cap locking means for releasably locking said cap in a closed position, said locking means including a pipe section and a spring attached to one end of said pipe section biasing said pipe section in a first position, said pipe section having a plurality of spaced slots formed therein and a cord attachment member, said locking means including a lock with a cylindrical body and a cord having one end attached to the cylindrical body and another end to said cord attachment member, said cap including a plurality of spaced hooks adapted to be received within said spaced slots when said pipe section is in said first position, and locked within said slots when said cylinder body is rotated so as to place said pipe section in a second position.

20. An automobile cover assembly as recited in claim 19, further comprising a cover having a main sheet and an auxiliary sheet attached to said main sheet, said auxiliary sheet including a plurality of spaced holes and adapted to receive said spaced hooks.

21. An automobile cover assembly comprising:
   a case adapted for attachment to the automobile; a cap, said cap including a rod having a plurality of hooks serially spaced along said rod;
   locking means for releasably locking said cap to said case;
   a rotary shaft rotatively supported within said case; and
   an automobile cover having a main sheet portion with two elongated side edges and a first and a second end edge, said automobile cover further including an auxiliary sheet having an edge secured to said main sheet at a position closer to said first end edge than to said second end edge, said auxiliary sheet having a plurality of openings formed therein which are spaced so as to receive said hooks therethough such that said cap can be closed while said main sheet is external to said case.

22. An automobile cover assembly as recited in claim 21 wherein said auxiliary sheet includes an attachment strip positioned for attachment with said rotary shaft.

23. An automobile cover assembly as recited in claim 22 wherein said main sheet includes attachment strips at said first and second end edges which are adapted for securement to the automobile.

24. An automobile cover assembly as recited in claim 21 further comprising an arc-shaped hinge member secured to said cap at one end, said arc-shaped hinge member having a guide slot formed therein and said case including a pin adapted to be retained within said guide slot, said guide slot including a hook-shaped section which is dimensioned to receive said pin such that said cap is releasably secured in an open position, said case further comprising a spring biased projection member being sufficiently compressed so as to force said cap into said open position when said locking means is released.

25. An automobile cover assembly as recited in claim 24 further comprising a light and switching means, said switching means including a projection which assumes a first position when said cap is closed and a second position when said cap is open, and said light being lit when said projection is in said second position.

26. An automobile cover assembly as recited in claim 21 wherein said rod is rotatively secured to said cap; and said cover assembly further comprising means for releasably retaining said rod in a first rotation position and in a second rotation position.

27. An automobile cover assembly for attachment with an automobile having bumper support means and a bumper directly supported by the bumper support means, said cover assembly comprising:

a case having means for direct attachment of said case to the bumper support means of the automobile such that said case forms an integral component of the bumper of the automobile;

a flexible cover;

a rotary shaft having means for securement with said flexible cover;

mounting means within said case for supporting said rotary shaft; and an airflow conduit, said case including an opening and said airflow conduit having one end opening into the opening in said case, said conduit having an opposite end with an air receiving scoop attached thereto, said air receiving scoop having means for attachment with a grill portion of the automobile, and said conduit being positioned such that air travels through said conduit past a heated region of the automobile and into the casing whereby drying of the cover is expedited.

28. An automobile cover assembly as recited in claim 27 further comprising an automobile cover, a cap hingedly supported by said case, and locking means for locking said cap, said locking means including a plurality of hooks and a support structure attached to said case, said support structure having a plurality of space openings positioned for receipt therethrough of said hooks and said cover featuring a plurality of openings which are arranged so as to receive said hooks therethrough such that said cover is adapted to be releasably locked to said case when said cap is locked in a closed position.

29. An automobile cover assembly for attachment with an automobile having bumper support means and a bumper directly supported by the bumper support means, said cover assembly comprising:

a case having means for direct attachment of said case to the bumper support means of the automobile such that said case forms an integral component of the bumper of the automobile;

a flexible cover;

a rotary shaft having means for securement with said flexible cover;

mounting means within said case for supporting said rotary shaft;

a cap hingedly supported by said case; and locking means for locking said cap, said locking means including a plurality of hooks and a support structure attached to said case, said support structure having a plurality of openings positioned for receipt therethrough of said hooks, and said cover featuring a plurality of openings which are arranged so as to receive said hooks therethrough such that said cover is adapted to be releasably locked to said case when said cap is locked in a closed position.

30. An automobile cover assembly as recited in claim 29 further comprising a rod rotatively secured to said cap, and biasing means for releasably locking said rod in a first rotation position and a second rotation position, and said hooks being secured to said rod.

* * * * *